UNITED STATES PATENT OFFICE.

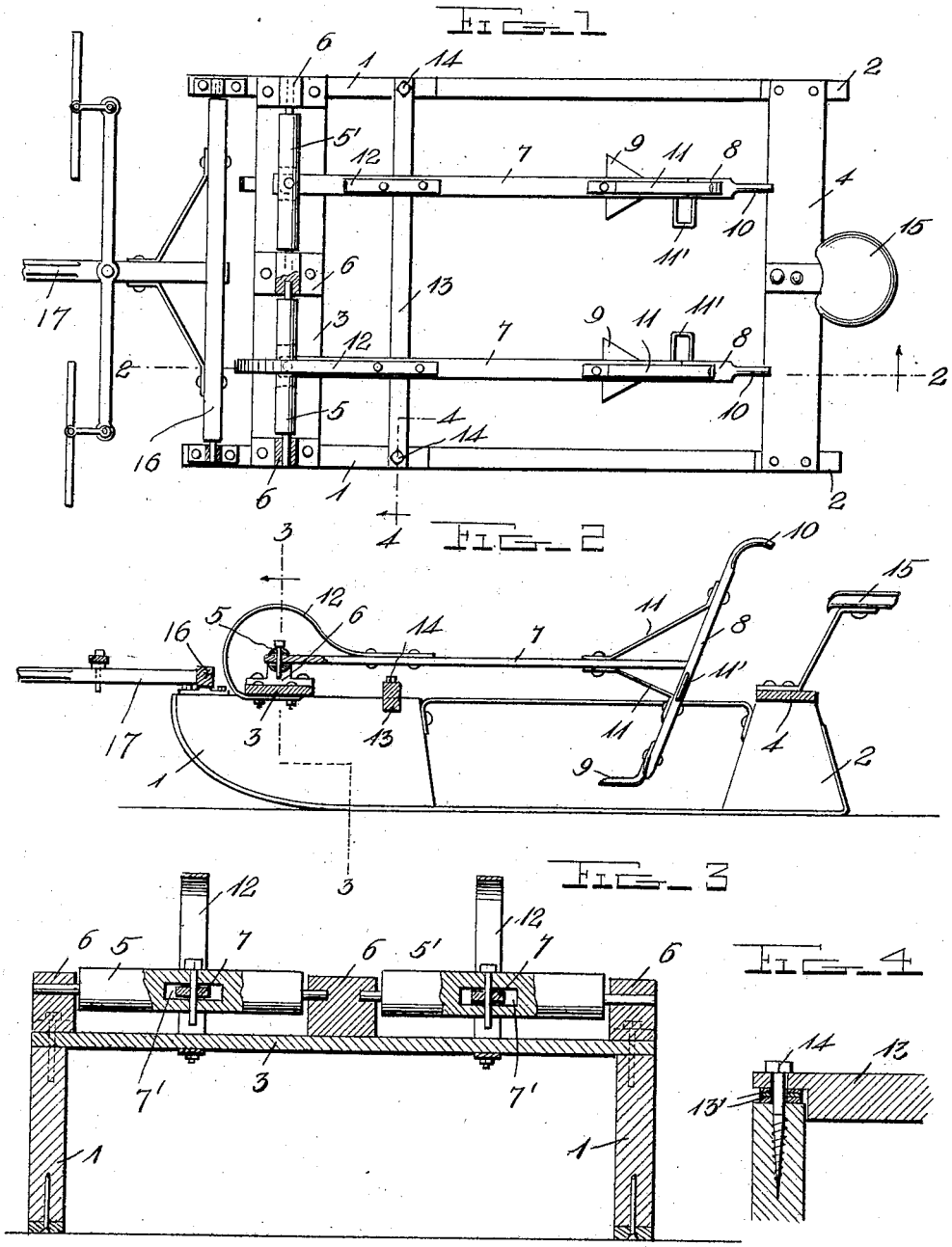

SAMUEL TRUITT, OF GUTHRIE, OKLAHOMA.

COTTON-CHOPPER.

No. 887,876.      Specification of Letters Patent.      Patented May 19, 1908.

Application filed November 11, 1907. Serial No. 401,720.

*To all whom it may concern:*

Be it known that I, SAMUEL TRUITT, a citizen of the United States, residing at Guthrie, in the county of Logan and State of Oklahoma, have invented certain new and useful Improvements in Cotton-Choppers; and I do declare the following to be a full, clear, and exact description of the invention, such as will enable others skilled in the art to which it appertains to make and use the same.

This invention relates to cotton choppers of that class which are drawn across the rows of growing cotton to remove portions of the plants, leaving at intervals the desired number of growing stalks.

The object of the invention is to provide a cotton chopper which will be simple in construction and efficient in action and provided with means for regulating the depth of the cutters and for raising them automatically above the ground when pressure thereon is removed.

In the accompanying drawings,—Figure 1 represents a top plan view of a cotton chopper embodying this invention; Fig. 2 represents a longitudinal section taken on line 2—2 of Fig. 1; Fig. 3 represents a transverse section taken on line 3—3 of Fig. 2; Fig. 4 is an enlarged sectional detail view taken on line 4—4 of Fig. 1.

In the embodiment illustrated, a chopper is shown mounted on runners 1 and 2, preferably composed of wood and cut out as shown in the drawings, and provided on their lower edges with steel shoes, whereby they are especially adapted for wear as well as for lightness. These runners are connected at their front ends by a cross bar 3, and at their rear ends by a cross bar 4, and rollers 5 and 5' are pivotally mounted over the front cross bar 3 in suitable bearing blocks, as 6. Pivoted to swing laterally in these rollers 5 and 5' are two rearwardly extending chopper-carrying bars, as 7, having inclined standards, as 8, mounted on their free ends. The front end of these bars extend through slots 7' arranged longitudinally of the rollers and of a size sufficient to permit lateral movement of said ends therein. At the lower ends of these standards 8 are the choppers or cutters 9, and these standards 8 are provided at their upper ends with handles, as 10, preferably connected with the bars by braces, as 11. Mounted on the cutter standards 8 are straps or stirrups 11', in which the feet of the driver are adapted to fit.

Flat curved springs as 12 are secured at one end to the underside of the cross bar 3, and are curved upwardly over said bar and the rollers carried thereby, and connected at their other ends to said beams, as 7, intermediately of their ends, and are adapted to normally hold said beams in raised position and the choppers out of contact with the ground. Extending transversely of the machine underneath the beams, as 7, and at the rear of the cross bar 3, is a vertically adjustable rod or bar 13 for regulating the depth to which the cutters are to cut into the ground. This bar 13 is preferably made adjustable by cutting out the ends thereof on its lower face and securing them to the runners 1 and 2 by screws, as 14. Washers as 13' are disposed on said screws to raise the bar 13 when desired and are removed when it is desired to lower it. A spring seat 15 is mounted on said frame, preferably on the rear cross bar 4, and the driver sits therein and places his feet in the stirrups 11 by means of which the cutters are regulated in the height in which they escape the ground. When the feet of the operator are withdrawn from these stirrups, the springs 12 elevate said cutters above the ground and permit them to pass over the cotton without removing it. A suitable bar 16 is mounted in the front ends of the runners to which the tongue 17 is attached.

I claim as my invention:

1. In a cotton chopper the combination of laterally spaced runners, cross bars connecting the front and rear ends thereof, rotatably mounted rollers on said front cross bar and having longitudinally extending slots therein, cutter carrying beams pivoted to spring laterally in the slots in said rollers, plate springs secured at one end to the lower face of said front bar and at their other ends to the upper faces of said beams, and a vertically adjustable bar mounted on said runners beneath said beams for limiting the downward movement of said beams.

2. In a cotton chopper the combination of a frame mounted on runners, a rotatably mounted roller supported at the front end of said frame and having a longitudinally extending slot therein, a cutter carrying beam pivoted to swing laterally in said slot, yieldable means for holding said beam normally in elevated position and means carried by said beam to provide for the depression thereof.

3. In a cotton chopper the combination of a suitably supported frame, a cutter carrying beam mounted at the front end of said frame for lateral and vertical movement and a cross bar arranged under said beam and having recessed ends for connection with said frame and a plurality of removable washers disposed in said recesses to provide for the vertical adjustment of the bar, to vary the downward extent of movement of the beam.

In testimony whereof I have hereunto set my hand in presence of two subscribing witnesses.

SAMUEL TRUITT.

Witnesses:
  CHAS. N. BAINBRIDGE,
  ALBERT BRADFORD CANFIELD.